US011276336B2

(12) United States Patent
Schmidling et al.

(10) Patent No.: US 11,276,336 B2
(45) Date of Patent: Mar. 15, 2022

(54) ILLUMINATED TRAFFIC SIGN

(71) Applicant: Traffic and Parking Control Co. Inc., Brown Deer, WI (US)

(72) Inventors: Nick J. Schmidling, Hubertus, WI (US); Nathaniel P. Meyer, Germantown, WI (US); Paul J. Farrell, Menomonee Falls, WI (US); Kyle M. Harvey, Milwaukee, WI (US)

(73) Assignee: Traffic and Parking Control Co. Inc., Brown Deer, WI (US)

( * ) Notice: Subject to any disclaimer, the term of this patent is extended or adjusted under 35 U.S.C. 154(b) by 0 days.

(21) Appl. No.: 17/249,053

(22) Filed: Feb. 18, 2021

(65) Prior Publication Data

US 2021/0264824 A1 Aug. 26, 2021

Related U.S. Application Data

(60) Provisional application No. 62/979,536, filed on Feb. 21, 2020.

(51) Int. Cl.
*G09F 13/06* (2006.01)
*G09F 13/04* (2006.01)
(Continued)

(52) U.S. Cl.
CPC ........ *G09F 13/0413* (2013.01); *G09F 13/005* (2013.01); *G09F 13/06* (2013.01); *G09F 13/16* (2013.01); *G09F 13/18* (2013.01); *G09F 13/22* (2013.01); *G09F 13/049* (2021.05); *G09F 13/0422* (2021.05); *G09F 13/0431* (2021.05);
(Continued)

(58) Field of Classification Search
CPC ...... G09F 13/0413; G09F 13/22; G09F 13/14; G09F 13/10; G09F 13/16; G09F 13/06; G09F 13/18; G09F 13/005; G09F 13/0472; G09F 13/0422; G09F 13/049; G09F 13/0431; G09F 2013/222; G08G 1/095; G08G 1/07; F24S 25/10; H02S 20/10;
(Continued)

(56) References Cited

U.S. PATENT DOCUMENTS 5,819,455 A * 10/1998 Tsuda ........................ G09F 9/33 40/580
6,147,623 A * 11/2000 Rippen ................ G08G 1/0955 340/907
(Continued)

FOREIGN PATENT DOCUMENTS

DE 3807385 A1 * 2/1989 ............. G09F 11/26

OTHER PUBLICATIONS

Temple, Inc. Temple Edge-Lit Internally-Illuminated LED Signs Data Sheet for The Razor's Edge, Copyright 2015.
(Continued)

*Primary Examiner* — Cassandra Davis
(74) *Attorney, Agent, or Firm* — James A. Joyce; Godfrey & Kahn, S.C.

(57) ABSTRACT

An illuminated traffic sign that includes a signage print coupled with a reflective sheet, a sign body for securably receiving the reflective sheet thereon, a plurality of symbol apertures formed in the sign body, wherein the symbol apertures align with portions of the signage print to be illuminated, and a plurality of symbol lamps positioned inside a light enclosure secured to the sign body.

17 Claims, 10 Drawing Sheets

(51) Int. Cl.
*G09F 13/16* (2006.01)
*G09F 13/18* (2006.01)
*G09F 13/00* (2006.01)
*G09F 13/22* (2006.01)

(52) U.S. Cl.
CPC .... *G09F 13/0472* (2021.05); *G09F 2013/222* (2013.01)

(58) Field of Classification Search
CPC .......... H02S 40/38; H02S 20/21; G02F 1/157; Y02E 70/30; Y02E 10/47; Y02E 10/50
See application file for complete search history.

(56) References Cited

U.S. PATENT DOCUMENTS

| | | | | |
|---|---|---|---|---|
| 6,198,410 | B1 * | 3/2001 | White | G09F 9/307 340/907 |
| 7,343,704 | B1 * | 3/2008 | Wilson | G09F 9/305 40/547 |
| 9,640,096 | B2 * | 5/2017 | Akwei | G09F 27/007 |
| 9,799,241 | B2 * | 10/2017 | Stockton | B60Q 1/268 |
| 10,229,591 | B2 * | 3/2019 | Baek | H02S 20/10 |
| 2006/0012486 | A1 * | 1/2006 | Gibson | G09F 9/33 340/815.45 |
| 2009/0079588 | A1 * | 3/2009 | Graham | G08B 5/006 340/908 |
| 2019/0043352 | A1 * | 2/2019 | Baek | H02S 20/10 |

OTHER PUBLICATIONS

OMNI Imagine Roadway Solutions Brochure dated 2019-2020, acquired Feb. 17, 2021.

Southern Manufacturing Illuminated Regulatory and Warning MUTCD Signs Printout, Copyright 2013.

Ellumin Cloud Vehicle Intersection Warning System website screenshot https://www.ellumin.com/project/vehicle-intersection-warning-system/ Copyright 2015-2024.

Ellumin Cloud Warning System LED Sign website screenshot https://www.ellumin.com/product-category/led-sign/Copyright 2015-2024.

Valid Manufacturing Ltd. Overhead Illuminated LED Sign Product Brochure, acquired Feb. 17, 2021.

Signal-Technologies Inc. Data Sheet for Wrong Way LED Sign, Product No. 15266, Copyright 2002-2021.

TraffiCalm Systems Wrong Way Warning Systems website screenshot https://trafficalm.com/wwa/ Copyright 2020.

Traffic Safety Corp. TS-SR-U2H7 Illuminated Crosswalk Overhead Sign website screenshot https://xwalk.com/product-categories/overhead-signs/ts-sr-u2h7-illuminated-crosswalk-overhead-sign/ Copyright 2021.

* cited by examiner

ILLUMINATED TRAFFIC SIGN

CROSS-REFERENCE TO RELATED APPLICATION

This application is a continuation of U.S. Provisional Patent Appl. No. 62/979,536 filed on Feb. 21, 2020, the disclosure of which is incorporated herein by reference in entirety for all purposes.

FIELD OF THE INVENTION

The invention relates generally to signage, and more particularly to illuminated signage.

BACKGROUND OF THE INVENTION

Various types of lighted traffic signs are known, although they suffer from numerous deficiencies. As such, there is a need for an improved lighted traffic sign.

BRIEF SUMMARY OF THE INVENTION

In at least some embodiments, the invention relates to an illuminated traffic sign comprising a signage print coupled with a reflective sheet; a sign body for securably receiving the reflective sheet thereon; a plurality of symbol apertures formed in the sign body, wherein the symbol apertures align with portions of the signage print to be illuminated; and a plurality of symbol lamps positioned inside a light enclosure secured to the sign body. Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
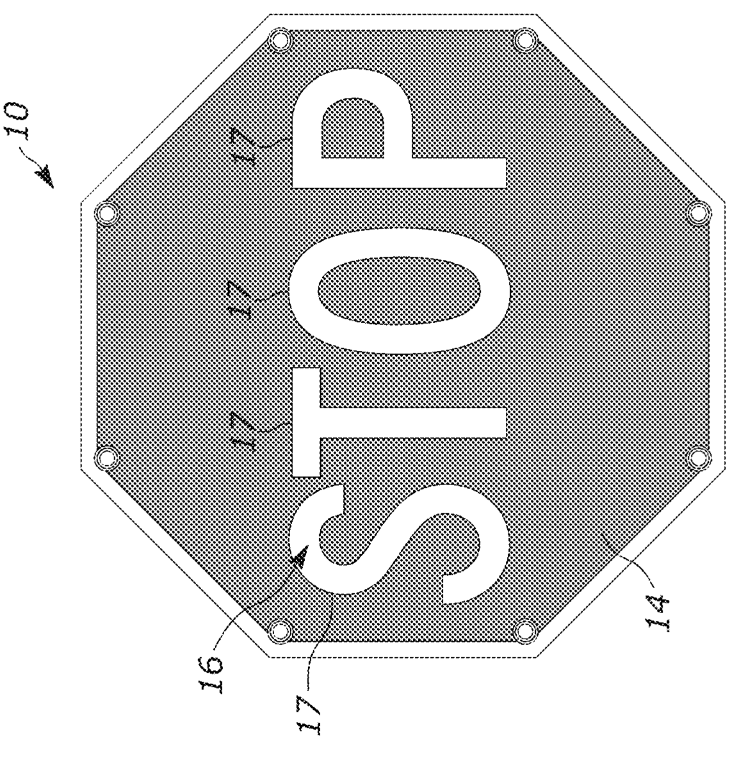
FIG. 1 is a front view of an exemplary embodiment of an illuminated traffic sign including a signage print, a reflective sheet, a sign body, and a light enclosure.
Figure 2:
FIG. 2 is a side view of the sign of FIG. 1.
Figure 3:
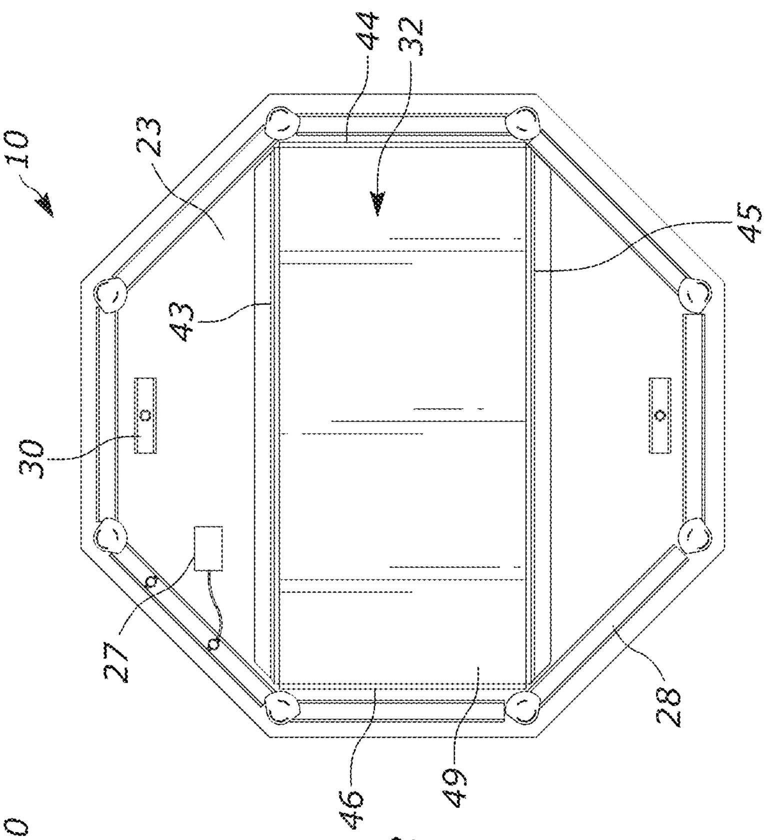
FIG. 3 is a rear view of the sign of FIG. 1.

Referring to FIGS. 1-3, front, side, and rear views of an exemplary embodiment of an illuminated traffic sign 10 are respectfully provided. As shown, in at least some embodiments, the sign 10 can be configured as a "STOP" sign, although in other embodiments the sign 10 can be configured to represent various other types of known and unknown signage, for example, "CURVE AHEAD", "WRONG WAY", etc. As such, the shape and lettering of the sign can be varied to match a desired sign shape and lettering.

Figure 4:
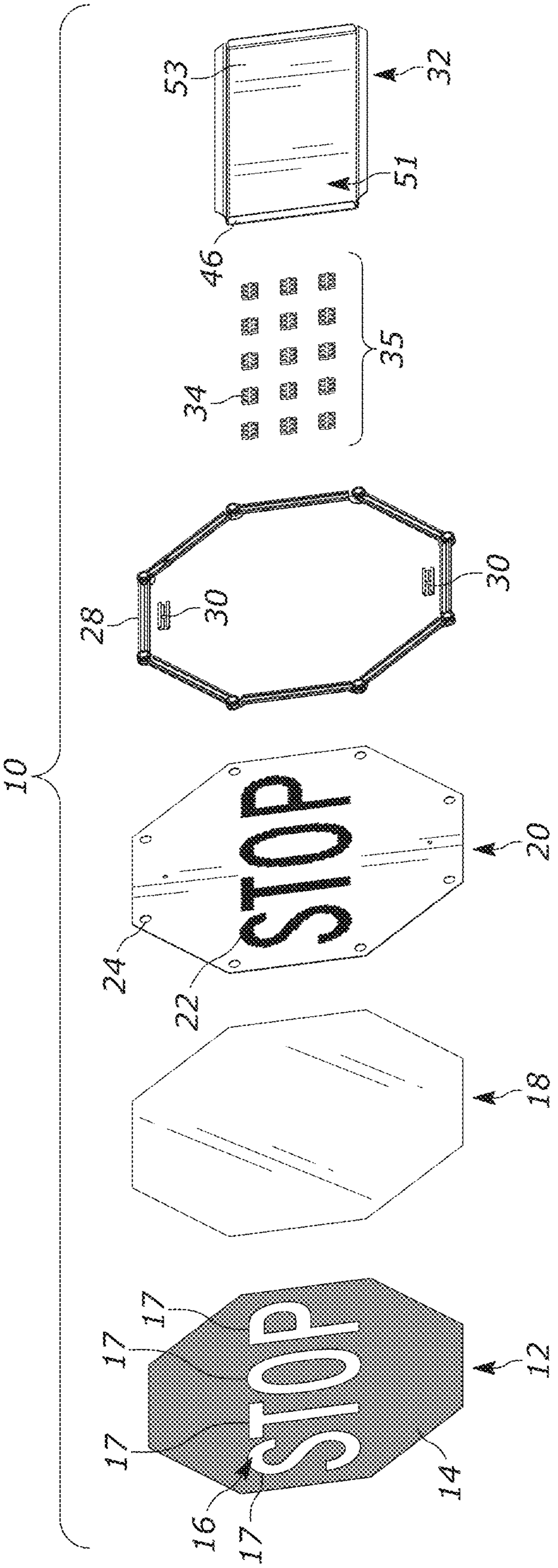
FIG. 4 is an exploded view of the sign of FIG. 1.

As seen in FIG. 4, the sign 10 can be comprised of several layered components, of which some can be integrally formed with each other in at least some embodiments, or can be separately formed and secured together.

Figure 5:
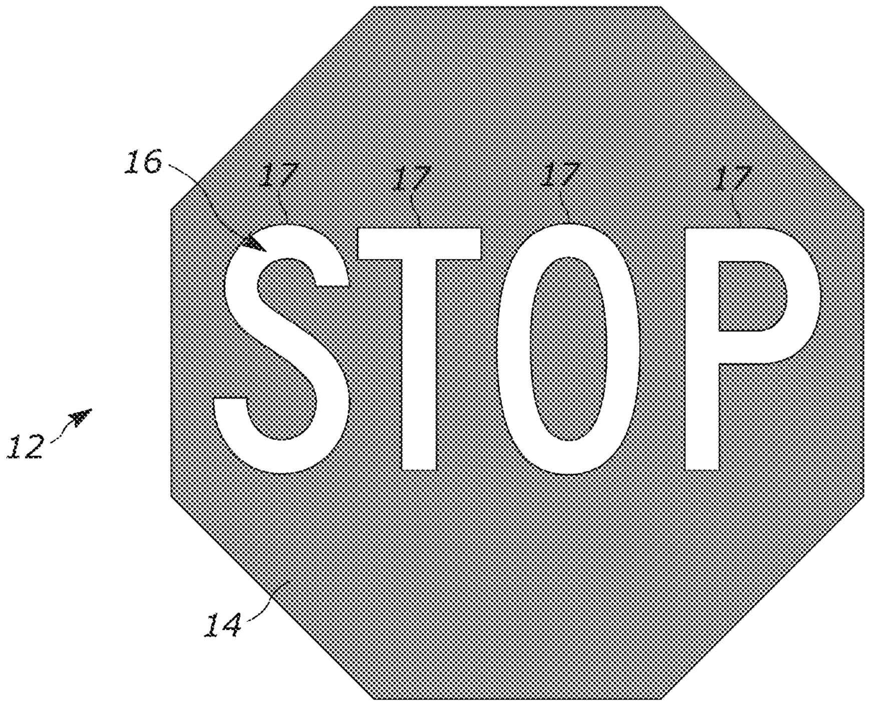
FIG. 5 is a front view of an embodiment of the signage print of FIG. 1.

Referring to FIG. 5, in at least some embodiments, the sign 10 includes a signage print 12 that is coupled with a reflective sheet 18. The signage print 12 can be comprised of one or more layers of ink that are applied (i.e., coupled) to the reflective sheet 18 using one or more known methods of application, such as silk screen printing and digital printing directly onto the reflective sheet, etc. In at least some embodiments, the signage print 12 can comprise a layer of transparent or translucent film with the ink applied thereto (e.g., 3M series 1170C film), which is then coupled to the reflective sheet 18 using an adhesive. In at least some embodiments the signage print 12 is comprised of a screen-printed translucent sheet of material that is shaped, sized, and colored to represent the desired signage (e.g. a red octagon for a STOP sign, a yellow triangle for a NO PASSING sign, etc.). The signage print 12 can include a background portion 14 that may be colored, and a symbol portion 16, wherein the symbol portion can be comprised of cutouts, translucent portions, or transparent portions within the background portion 14 to form desired symbols 17. The symbols 17 can include among other things, letters, numbers, representative shapes (e.g., turn arrows, bicycle, parent walking a child, a jumping deer, etc.). The signage print 12 is in at least some embodiments, comprised of a translucent red silk screen print coupled to the reflective sheet 18, while in other embodiments, the signage print 12 can comprise other colors and/or materials.

Figure 6:
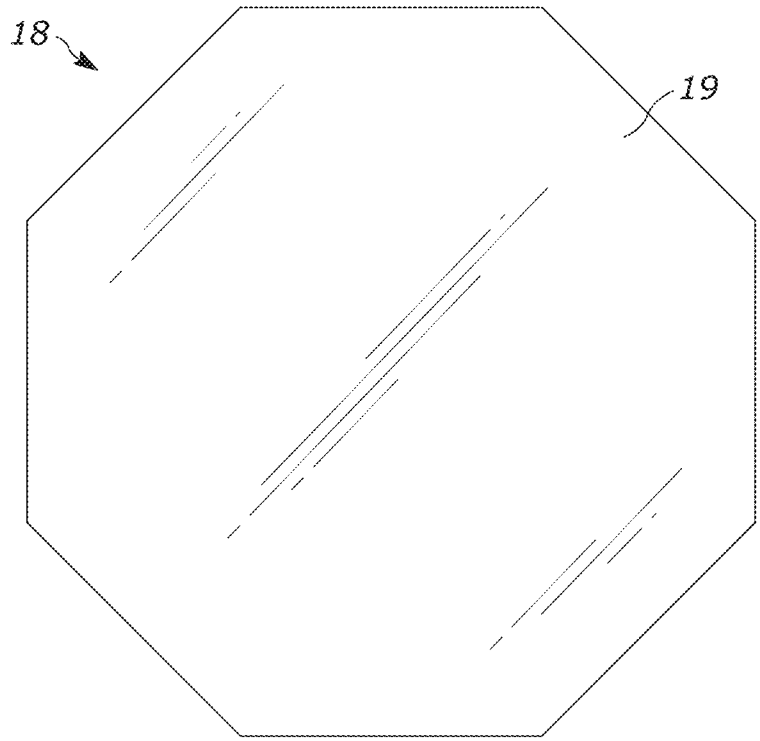
FIG. 6 is a front view of an embodiment of the reflective sheet of FIG. 1.

Referring to FIG. 6, in at least some embodiments, the sign 10 further includes the reflective sheet 18, which is generally shaped and sized to match the signage print 12. The reflective sheet 18 is in at least some embodiments, comprised of a white translucent retroreflective sheeting with a pressure sensitive adhesive backing, while in other embodiments can comprise other colors and materials. In at least some embodiments, the reflective sheet 18 is a translucent reflective sheet, such as a DG3 4090T translucent retroreflective sheet, as manufactured by 3M Company of Saint Paul, Minn. The signage print 12 is secured to a front surface 19 of the reflective sheet 18 using an adhesive.

Figure 7:
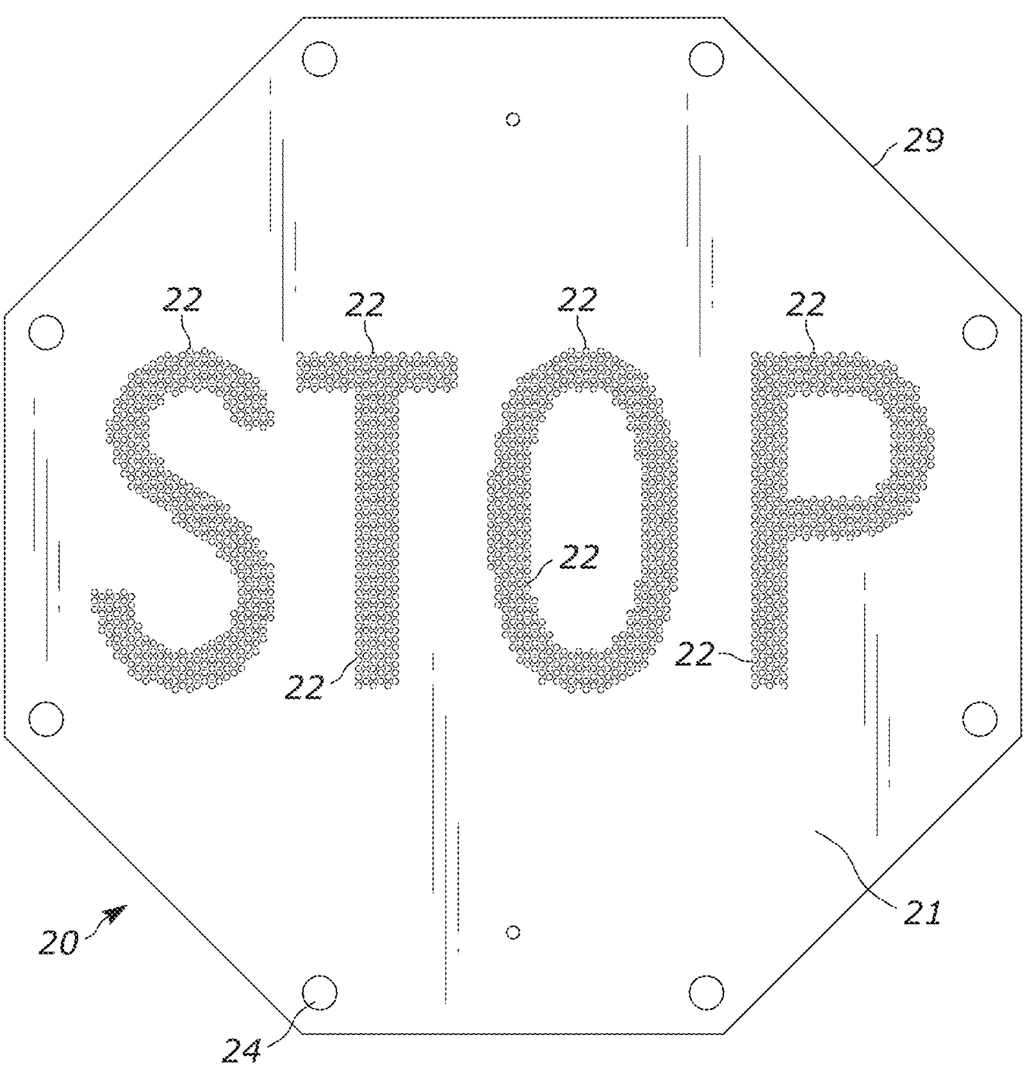
FIG. 7 is a front view of an embodiment of the sign body of FIG. 1.
Figure 8:
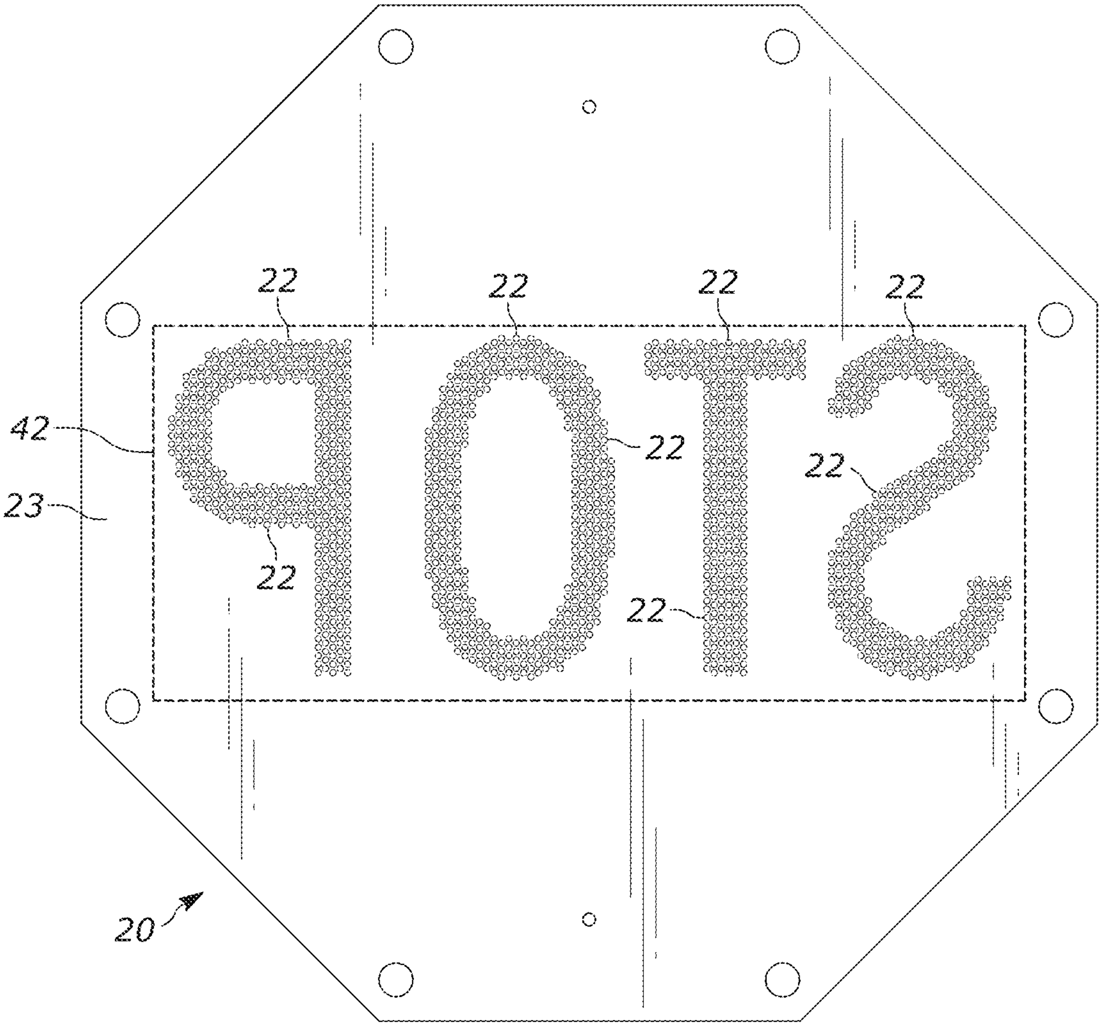
FIG. 8 is a rear view of the sign body of FIG. 7.

Referring to FIGS. 7 and 8, the sign 10 further includes a sign body 20 having a front surface 21 and a rear surface 23. The sign body 20 can be comprised of one or more of various materials. In at least some embodiments, the sign body 20 can be comprised of a rigid metallic material, such as aluminum, steel, etc., while in some other embodiments, the sign body 20 can be comprised of a rigid non-metallic material, such as a high-density polyethylene (HDPE) (e.g. 0.75 inch thick, etc.), while in yet further embodiments, the sign body can be comprised of a flexible material.

The sign body 20 includes a plurality of symbol apertures 22 extending between the front surface 21 and rear surface 23, wherein the symbol apertures 22 are distributed across the sign body 20 to substantially align and match the shape of the symbol portion 16 of the signage print 12, such that light projected through the symbol apertures 22 will substantially illuminate the symbol portion 16 of the signage print 12, wherein the adhesive backing on the reflective sheet 18 can be used to secure the reflective sheet 18 to the front surface 21 of the sign body 20. In at least some embodiments, the sign body 20 can include a plurality of perimeter apertures 24 sized and shaped to receive perimeter lamps 26, wherein in at least some embodiments, the perimeter lamps 26 can be utilized as blinking lamps, which can be used to highlight attention to the sign 10. The symbol apertures 22 and perimeter apertures 24 can be any one or more of various shapes and sizes, (e.g. circles, elongated slots, hexagons, etc.). In this manner various shapes and text symbols (e.g., triangles, chevrons, letters, numbers, etc.) can be represented.

Figure 9:
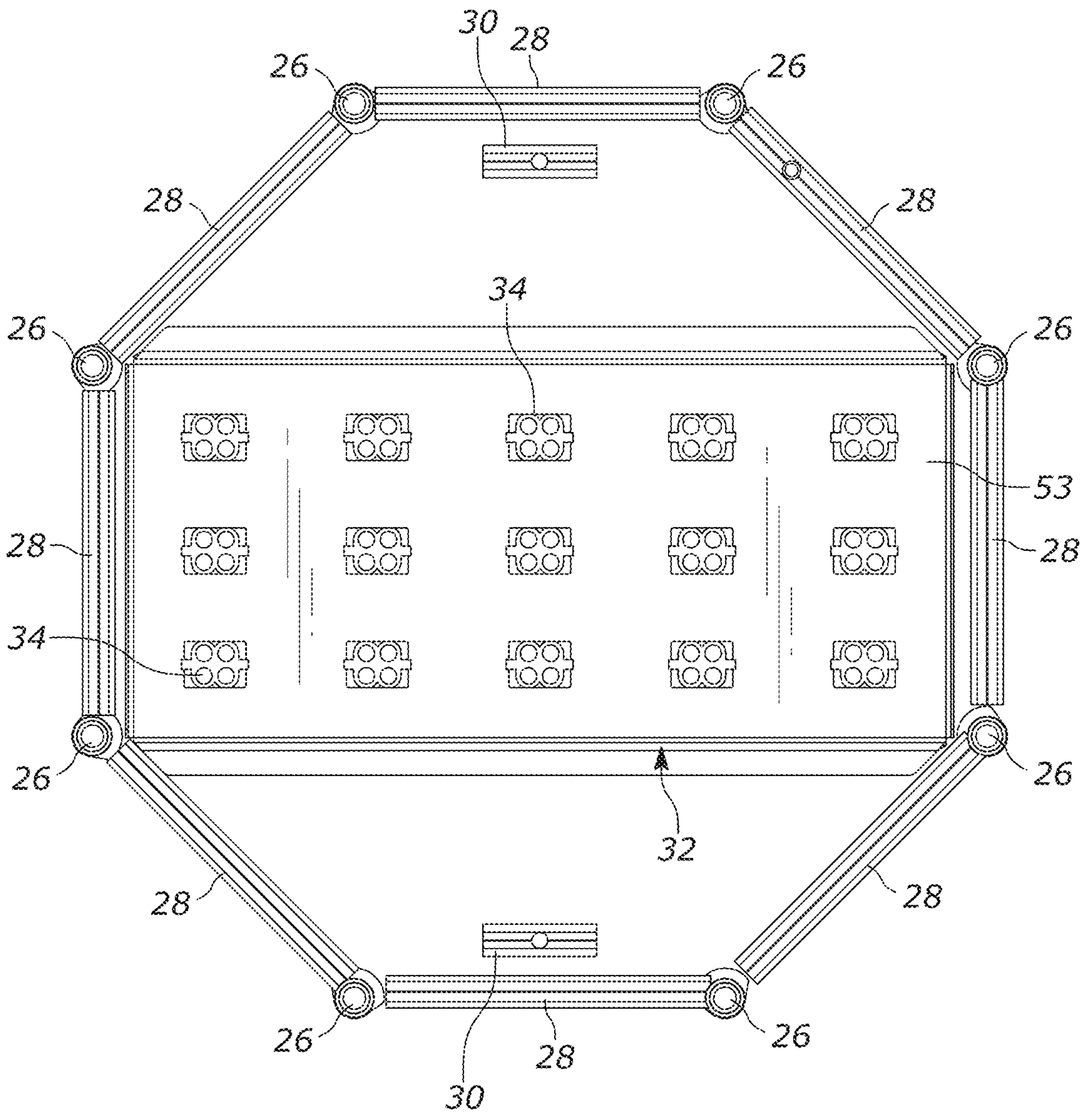
FIG. 9 is a front view of an embodiment of the light enclosure, further including wire channels, mounting spacers, and light modules.

Referring to FIG. 9, in at least some embodiments, the sign 10 further includes a plurality of wire channels 28 that can be secured to the sign body 20 and extend partially or completely about a perimeter 29 (FIG. 7) of the sign body. The wire channels 28 can be utilized to route wiring for the perimeter lamps 26. Mounting spacers 30 can also be provided on the sign body 20 to provide an offset for mounting the sign 10 to a pole or other surface. The sign 10 further includes a light enclosure 32 that is formed integrally with or secured to the rear surface 23 of the sign body 20, the securement can be accomplished using fasteners, welding, adhesive, etc. The light enclosure 32 is sized and shaped to house a plurality of symbol lamps 34 (e.g. LED modules, LED bulbs, etc.) that are positioned to direct light towards the symbol apertures 22 when the sign is assembled. Generally the light enclosure 32 includes a length, a width, and a depth, wherein the depth provides adequate spacing between the symbol apertures 22 and the symbol lamps 34, for example about one inch, although the depth can vary depending on various factors, such as the type and quantity of the symbol lamps 34, etc. In at least some embodiments, the light enclosure 32 is pan-shaped having a planar main wall 49 surrounded by four perimeter walls 43, 44, 45, 46 that establish a perimeter 48 about the light enclosure, while in other embodiments the light enclosure 32 can take other forms, such as circular, oblong, triangular, etc. When the light enclosure 32 is secured to the rear surface 23 of the sign body 20, the main wall 49 and perimeter walls 43, 44, 45, 46 form a light cavity 51.

Figure 10:
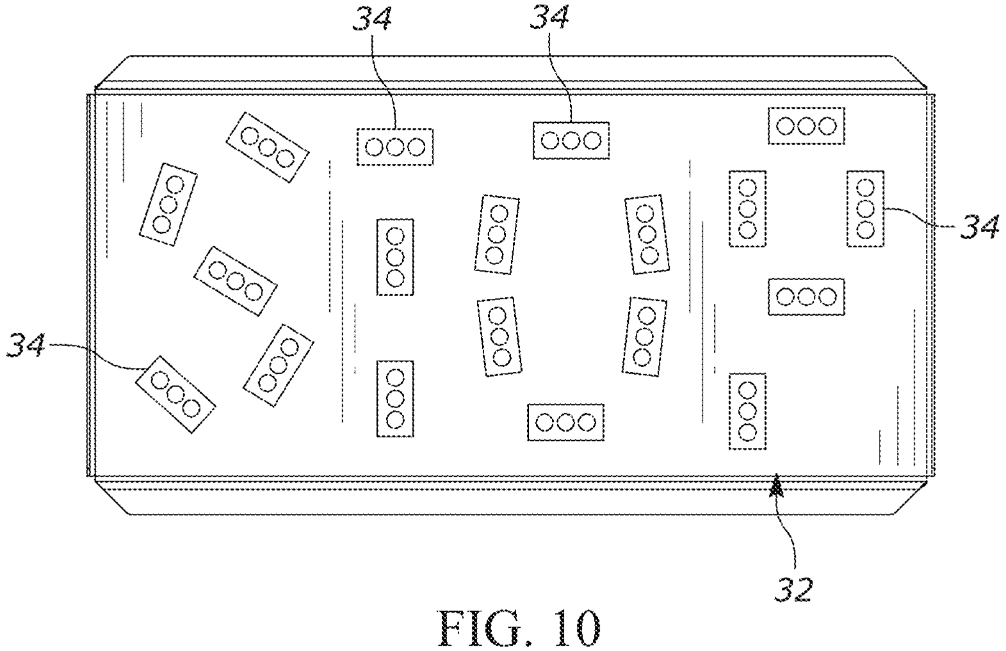
FIG. 10 is a front view of the light enclosure illustrating the light modules in another positional configuration.
Figure 11:
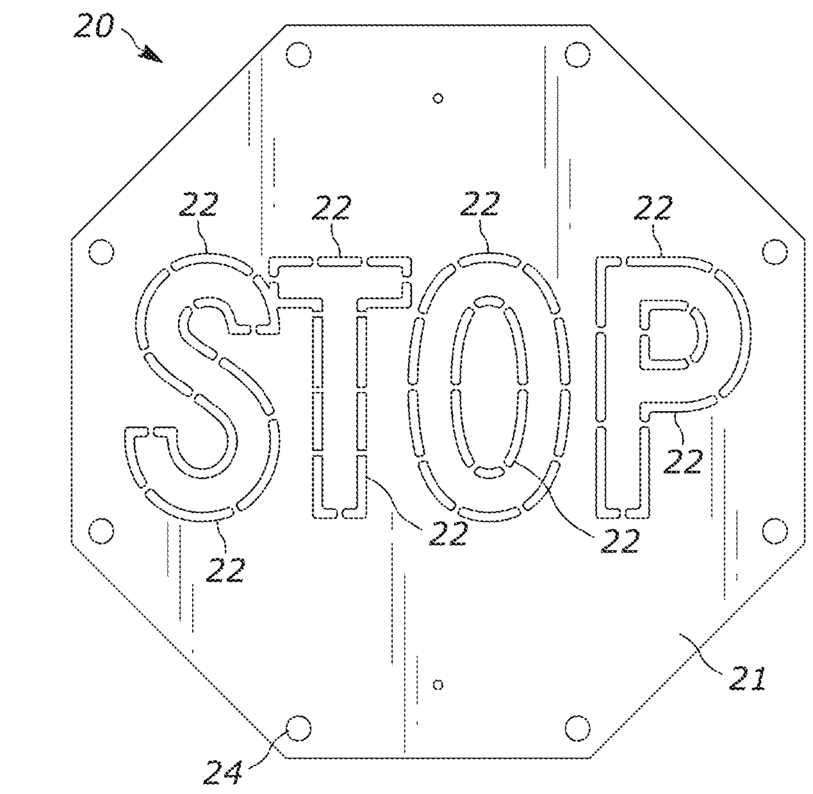
FIG. 11 is a front view of another exemplary embodiment of the sign body.
Figure 12:
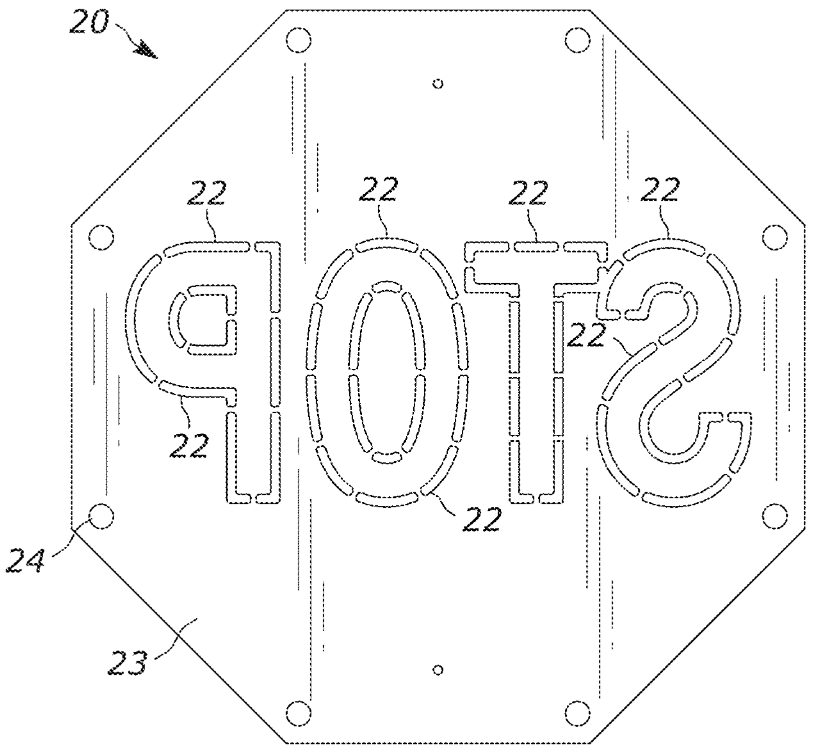
FIG. 12 is a rear view of the sign body of FIG. 11.
Figure 13:
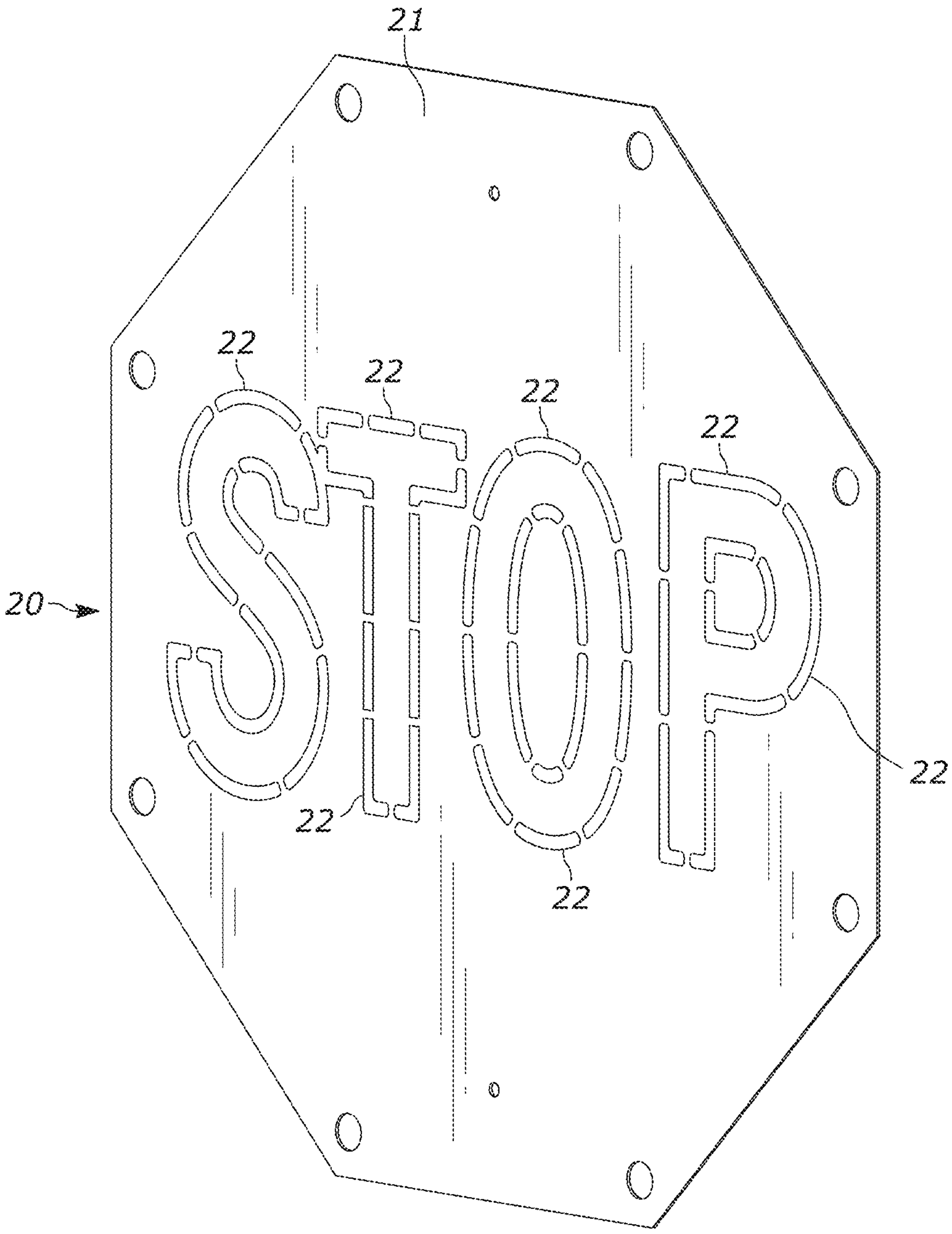
FIG. 13 is a front perspective view of the sign body of FIG. 11.
Figure 14:
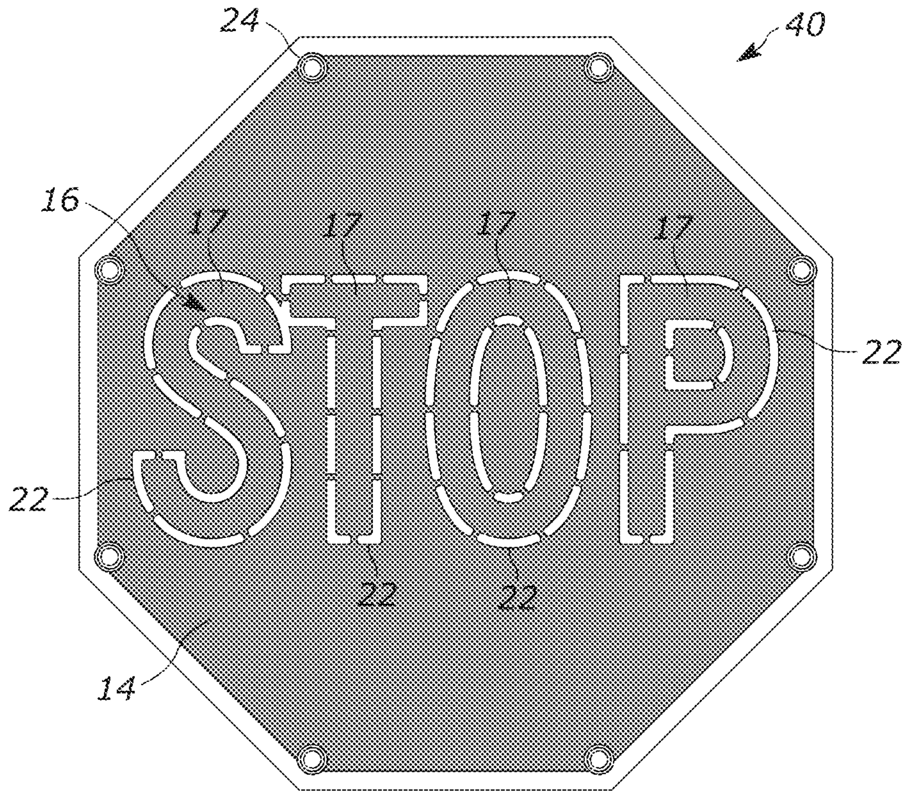
FIG. 14 is a front view of an exemplary embodiment of the illuminated traffic sign utilizing the sign body of FIG. 11.

In at least some embodiments, the plurality of symbol lamps 34 are positioned inside the light cavity 51. In at least some embodiments, the plurality of symbol lamps 34 are secured to an inner surface 53 of the light enclosure 32 and positioned in a substantially evenly-spaced light array 35 (FIG. 4), wherein the symbol lamps 34 are placed in straight rows and columns, while in other embodiments, the symbol lamps 34 can be positioned in the light cavity 51 to follow the contour of the symbol apertures 22, such as seen in FIG. 10, illustrating light enclosure 32 with a plurality of symbol lamps 34 positioned to illuminate the symbol apertures 22 to form the word "STOP." In at least some embodiments, the symbol lamps 34 are positioned to illuminate the symbol apertures 22, while preventing or substantially preventing illuminating the entire rear surface 23 of the sign body 20 by the light enclosure 32. In at least some embodiments, the light enclosure 32 and light cavity 51 are substantially smaller than the sign body 20 and therefore do not shine light onto the entire rear surface 23 of the sign body 20. In at least some embodiments, the light enclosure 32 and light cavity 51 have a size and shape that is limited to cover only a central portion 42 of the rear surface 23 of the sign body 20 (see FIG. 8 for example), wherein in at least some embodiments, the central portion 42 is limited to the area immediately adjacent to the symbol apertures 22.

In at least some embodiments, the perimeter lamps 26 and the symbol lamps 34 are Light Emitting Diodes (LEDs), although in other embodiments, other light sources such as fluorescent, incandescent, etc. can be utilized alone or in combination with LEDs. The use of LEDs allows for a thin profile, similar to a conventional unlit sign. Wiring and powering circuitry for LEDs, as well as other types of lamps, is well known, therefore it shall be understood that any of various known types of lighting circuitry, wiring, drivers, etc. to selectively illuminate (on, off, flash, etc.) the perimeter lamps 26 and symbol lamps 34 when connected to a power supply can be included in the sign 10. The perimeter lamps 26 and symbol lamps 34 receive power directly or indirectly from one or more sources of power, such as a direct current (DC) supplied by a battery 31, a solar panel 33 (i.e., a photovoltaic module), and/or a controller 36 (see FIG. 15).

In at least some embodiments, the source(s) power can be coupled to the perimeter lamps 26 and symbol lamps 34 using a power connector 27 (FIG. 3) that exits the wire channel 28. In embodiments where the configuration provides illumination to a portion (e.g., the central portion 42) of the sign body 20, less power is required than if illuminating the entire sign 10, thereby minimizing the load requirements and allowing for efficient use of solar and battery power. This further allows for the sign 10 to be used in locations that lack a dedicated supply of wired power (e.g., AC power line, etc.).

Figure 15:
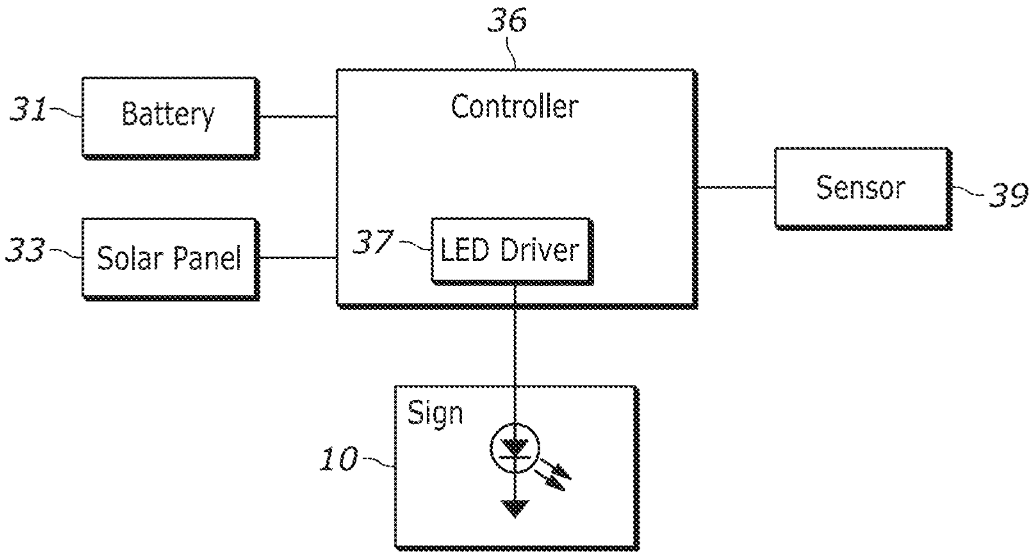
FIG. 15 is a block diagram of an exemplary control system for activating the sign.

The illumination features of the sign 10 provides enhanced visibility in low light situations and when vehicle headlights are not directly casting onto the retroreflective portion of the sign 10. The sign 10 can be activated to illuminate in various manners. For example, detection sensors 39 (FIG. 15) can be used to identify the direction and/or presence of an object to be used as a trigger to activate illumination of the sign 10. Detection sensors used for identifying an object's directionality or presence can include thermal, radar, infrared, laser, and other known sensing technologies. The detection sensor(s) 39 provides a detection signal that can be used to activate the multiple illumination sources simultaneously or independently. More particularly, in at least some embodiments, a detection sensor can provide a detection signal by closing a dry contact closure in a controller 36. Closure of the dry contact acts as a detection signal and sends a powered output signal to the sign 10 to illuminate the sign 10. For example, as seen in FIG. 15, in at least some embodiments, the controller 36 can receive power from one or both of the battery 31 and solar panel 33, along with the detection input from the detection sensor 39; the controller 36 can include an LED driver 37 coupled to the power connector 27 for providing the powered output signal to the sign 10 when the detection sensor is activated. In at least some embodiments, the controller 36 can include various types of known controllers capable of receiving an input signal and providing a powered output to another device based on receipt of the input signal, for example an Intelligent Warning System (IWS) controller part no. 134227V, as manufactured by TAPCO in Brown Deer, Wis., USA. The aforementioned components can be electrically coupled using known methods to include any of various configurations to provide the desired sensing and illumination of the sign 10.

In at least some embodiments, the sign 10 can be hard-wired to and activated by more than one controller 36, and a single controller can be used to activate more than one sign 10. In addition, one or more signs 10 can be activated by the output of one or more controllers 36 wirelessly, such as when a network of radios or another communication device is used. In at least some embodiments, the brightness level of the symbol lamps 34 can be configured to automatically increase (via the controller 36) when a detection sensor senses that an approaching driver appears to disobey the intended warning language of the sign 10 (e.g., going the Wrong Way, or entering a road that has a Do Not Enter sign). In at least some embodiments, the perimeter lamps 26 and symbol lamps 34 can be independently controlled and triggered, including intensity, flash pattern, flash rate, and on/off. The connection between the sign 10 and controller 36 can include separate powered output signals to activate the symbol lamps 34 separate from the perimeter lamps 26.

Further, in at least some embodiments, the sign 10 can incorporate or otherwise utilize ambient light detection to facilitate on/off/brightness control of the perimeter lamps 26 and symbol lamps 34. In at least some embodiments, the symbol lamps 34 are enabled during periods of low light (e.g., night), which can be controlled through light sensing detection or through a sensed voltage change in the solar panel 33. In at least some embodiments, the controller 36 can be used to remotely change settings for various reasons, such as turning the sign 10 on during inclement weather, etc. In at least some embodiments, the signage print 12, reflective sheet 18, and sign body 20 are generally planar, and can be comprised of one or more types of materials. The use of lamps as disclosed herein provides enhanced visibility, which can increase driver obedience and therefore increase safety.

As noted above, the symbol apertures 22 and perimeter apertures 24 can include various shapes and sizes, (e.g. circles, elongated slots, hexagons, etc.), as can the symbol portion 16 of the signage print 12. FIGS. 11-14 represent a second exemplary embodiment of an illuminated traffic sign 40 wherein the symbol apertures 22 in the sign body can take the form of a plurality of slots positioned to outline the perimeter of each desired symbol 17. In this embodiment, the symbol portion 16 of the signage print 12 can include matching slot shaped cutouts or clear portions of the background portion 14 to allow illumination from the symbol lamps 34 therethrough. The securement of the various components can be achieved using any of various known methods to secure different materials, although in at least some embodiments, an adhesive is utilized.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage. The term "plurality" as used herein shall be understood to include one or more.

What is claimed is:

1. An illuminated traffic sign comprising:
- a signage print secured to a front surface of a reflective sheet;
- a sign body for securably receiving the reflective sheet thereon, wherein the reflective sheet includes an adhesive backing that is secured to a front surface of the sign body;
- a plurality of symbol apertures formed in the sign body, wherein the symbol apertures align with portions of the signage print to be illuminated; and
- a plurality of symbol lamps positioned inside a light enclosure secured to the sign body.

2. The illuminated traffic sign of claim 1, wherein a perimeter of the light enclosure is smaller than the perimeter of the sign body.

3. The illuminated traffic sign of claim 2, wherein the symbol lamps are positioned in the light enclosure to substantially follow a contour of the symbol apertures.

4. The illuminated traffic sign of claim 2, wherein the sign body includes a plurality of perimeter apertures positioned along the perimeter of the sign body, and a plurality of perimeter lamps situated in the perimeter apertures.

5. The illuminated traffic sign of claim 2, wherein the sign body is metal.

6. The illuminated traffic sign of claim 5, wherein the signage print includes a background portion and a symbol portion and wherein the symbol portion comprises at least one of a cutout or a transparent portion of the background portion to outline one or more symbols.

7. The illuminated traffic sign of claim 6, wherein the signage print includes a film.

8. The illuminated traffic sign of claim 5, wherein the light enclosure is pan-shaped having a planar main wall surrounded by perimeter walls.

9. The illuminated traffic sign of claim 8, wherein the planar main wall of the light enclosure is rectangular shaped.

10. The illuminated traffic sign of claim 1, wherein the signage print is a silk screen print.

11. The illuminated traffic sign of claim 1, wherein the light enclosure allows the symbol lamps to illuminate the symbol apertures without illuminating the entire rear surface of the sign body.

12. The illuminated traffic sign of claim 11, wherein the light enclosure covers only a central portion of a rear surface of the sign body.

13. The illuminated traffic sign of claim 12, wherein the central portion is limited to an area immediately adjacent to the symbol apertures.

14. The illuminated traffic sign of claim 13, wherein the plurality of symbol lamps are positioned in a substantially evenly spaced light array of rows and columns.

15. An illuminated traffic sign comprising:
- a signage print coupled with a reflective sheet;
- a sign body for securably receiving the reflective sheet thereon, wherein the sign body includes a plurality of perimeter apertures positioned along a perimeter of the sign body, and a plurality of perimeter lamps situated in the perimeter apertures;
- a plurality of symbol apertures formed in the sign body, wherein the symbol apertures align with portions of the signage print to be illuminated;

a plurality of symbol lamps positioned inside a light enclosure secured to the sign body; and a plurality of wire channels secured to the sign body and extending substantially about the perimeter of the sign body.

16. The illuminated traffic sign of claim 15, wherein the symbol lamps are electrically coupled to a controller to receive a powered output signal therefrom to illuminate the symbol lamps.

17. The illuminated traffic sign of claim 16, wherein the powered output signal is received from the controller when a detection signal is received from a detection sensor interconnected with the controller.

* * * * *